United States Patent
Takamatsu et al.

(10) Patent No.: US 7,923,961 B2
(45) Date of Patent: Apr. 12, 2011

(54) VEHICLE EQUIPPED WITH MOTOR AND INVERTER

(75) Inventors: Naoyoshi Takamatsu, Susono (JP); Masaki Okamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 79 days.

(21) Appl. No.: 12/458,762

(22) Filed: Jul. 22, 2009

(65) Prior Publication Data

US 2010/0052583 A1 Mar. 4, 2010

(30) Foreign Application Priority Data

Aug. 27, 2008 (JP) .................. 2008-218166

(51) Int. Cl.
*H02P 23/00* (2006.01)
(52) U.S. Cl. ........................ 318/811; 318/599
(58) Field of Classification Search .................. 318/139, 318/811, 599, 461, 799, 801, 432, 434
See application file for complete search history.

(56) References Cited

U.S. PATENT DOCUMENTS

| | | | | |
|---|---|---|---|---|
| 5,801,497 | A * | 9/1998 | Shamoto et al. | 318/139 |
| 6,274,942 | B1 * | 8/2001 | Pels | 290/40 B |
| 7,049,779 | B2 * | 5/2006 | Chen et al. | 318/400.09 |
| 2004/0140139 | A1 * | 7/2004 | Malik | 180/65.2 |

FOREIGN PATENT DOCUMENTS

| | | |
|---|---|---|
| JP | A-63-257497 | 10/1988 |
| JP | A-2-202368 | 8/1990 |
| JP | A-9-70195 | 3/1997 |
| JP | A-2002-010668 | 1/2002 |
| JP | A-2002-153096 | 5/2002 |
| JP | A-2002-315345 | 10/2002 |
| JP | A-2006-000731 | 1/2006 |
| JP | A-2006-217776 | 8/2006 |
| JP | A-2007-282298 | 10/2007 |

OTHER PUBLICATIONS

Jun. 8, 2010 Office Action issued in Japanese Patent Application No. 218166/2008 (with partial English translation).

\* cited by examiner

*Primary Examiner* — Rina I Duda
(74) *Attorney, Agent, or Firm* — Oliff & Berridge PLC

(57) ABSTRACT

A vehicle includes a motor for driving wheels WH, an inverter to drive the motor, and a control device to perform PWM control of the inverter. The control device performs synchronous PWM control in a case where an electric current supplied to the motor by the inverter or torque generated in the motor is larger than a threshold value; and performs the synchronous PWM control or non-synchronous PWM control in a case where the electric current or the torque is smaller than the threshold value and sets carrier frequency or a pulse number of the PWM control to be higher than the case where the electric current or the torque is larger than the threshold value. Thereby, it is possible to provide a vehicle of achieving reduction of noise, reduction of cost and improvement of fuel consumption in a balanced manner.

4 Claims, 8 Drawing Sheets

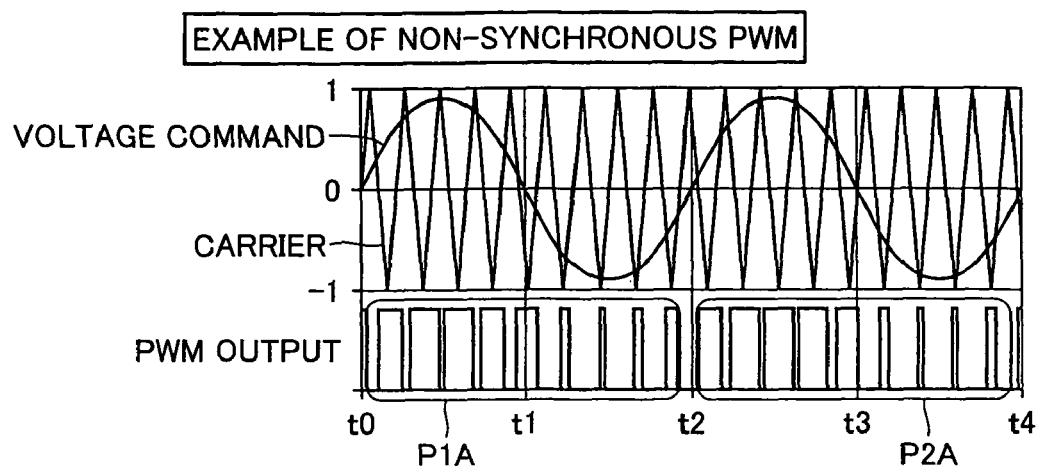
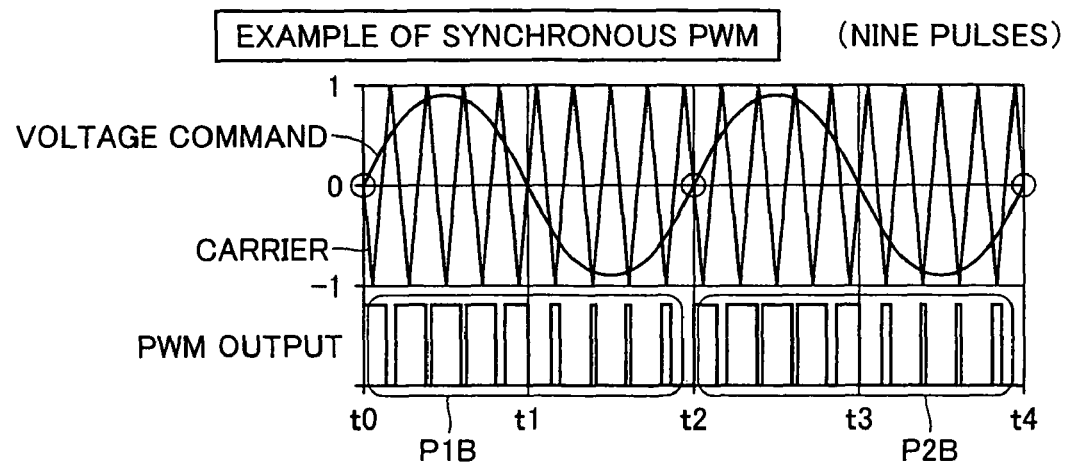

VEHICLE EQUIPPED WITH MOTOR AND INVERTER

This nonprovisional application is based on Japanese Patent Application No. 2008-218166 filed on Aug. 27, 2008 with the Japan Patent Office, the entire contents of which are hereby incorporated by reference.

BACKGROUND OF THE INVENTION

1. Field of the Invention

This invention relates to a vehicle, particularly to a vehicle equipped with an inverter to drive a motor for driving the vehicle and a control device thereof.

2. Description of the Background Art

In recent years, an eco-friendly vehicle to use a motor for driving the vehicle such as an electric vehicle, a hybrid vehicle and a fuel cell vehicle is drawing public attention.

Japanese Patent Laying-Open No. 09-070195 discloses a control device of a motor capable of handling even in a case where rapid heat generation is caused in a switching device. In a case where a rotation speed of the motor is sufficiently low, this motor control device determines that the motor is locked by external force and switches carrier frequency of a PWM (pulse width modulation) signal from a normal value of 10 kHz to 1.25 kHz. In accordance with a decrease in the carrier frequency of the PWM signal, switching frequency of the switching device of an inverter is decreased and a switching loss is reduced. Therefore, there is no risk that rapid heat generation is caused in the each switching device of the inverter even when the motor is locked.

In the inverter for driving the vehicle, there are strong demands for downsizing and reducing cost. Therefore, it is not possible to sufficiently increase carrier frequency fc relative to output frequency fv in order to suppress the switching loss. Originally, the pulse number in PWM control is desirably about 15 pulses or more per one cycle of output frequency fv. Particularly when high torque is generated, an inverter conduction loss is increased and a heat generation amount is also increased. Therefore, there is a need for preventing overheat and reducing the heat generation in this region. However, when the inverter is designed so as to drive with high carrier frequency in all operating regions, size of the inverter becomes bigger and the cost of the inverter is increased.

When carrier frequency fc is simply decreased in order to reduce the switching loss, a controllability of the motor is deteriorated. Therefore, since there is a risk of vibration of the vehicle due to pulsation of the torque and breakage of parts due to out-of-control on an electric current, it is not allowable to simply decrease carrier frequency fc. Synchronous PWM control is sometimes adapted in order to ensure the controllability at the low pulse number. However, conversely at the time of low torque such as steady traveling with little noise inside the vehicle, there is a possibility that an electromagnetic sound by inverter switching is annoying. Although frequency of the sound can be changed by changing the pulse number, it is not possible to arbitrarily change the frequency due to restriction of synchronization.

Losses in the inverter and the motor are changed by carrier frequency fc so as to influence over efficiency of the inverter and motor. Therefore, even with an operating condition without problem in the controllability and the noise, there is a need for properly determining carrier frequency fc. Particularly for a purpose of the vehicle, when the efficiency is improved in a practical region with relatively low torque highly frequently used, fuel consumption is improved.

Since there is a subject of achieving ensuring of the controllability, reduction of the cost, reduction of the noise inside the vehicle and further improvement of the efficiency at the same time, an inverter control method suitable for a way of using the vehicle is desired.

Here, as shown in Japanese Patent Laying-Open No. 2006-217776, in a case where the synchronous PWM control is adapted, in order to prevent distortion of even harmonics from overlapping with output voltage, carrier frequency fc is selected to be an odd multiple of output frequency fv or multiples of three of the carrier frequency in order to match the output voltage of a three-phase inverter; and two kinds of carriers which are inversion and non-inversion are provided. Therefore, the carrier frequency fc has only discrete value.

For example, a case where there is a restriction that carrier frequency fc is sixfold, ninefold, twelvefold, fifteenfold . . . of output frequency fv will be described. Hereinafter, the term pulse number will be used in the description, e.g. when the carrier frequency is sixfold of output frequency fv, the pulse number is six pulses. In order to distribute carrier frequency fc, high carrier frequency fc is used such as nine pulses of 1.5 times more or twelve pulses of 2 times more than minimum-required six pulses. Therefore, the switching loss is increased, a problem of overheat in the inverter is caused, and hence there is a cost problem in order to prepare an inverter resistant to the above problem.

A method of selecting carrier frequency fc in an operating state capable of achieving the controllability and the reduction of the noise at the same time is not clearly stated. Therefore, in a case where carrier frequency fc is set to be higher than necessary, there is a possibility of an increase in the loss and a deterioration of the fuel consumption. In other words, since too much importance is conventionally given to improvement of the controllability and the reduction of the noise, there is sometimes a case where the cost of the inverter is high and there is some room for improving the fuel consumption.

SUMMARY OF THE INVENTION

An object of this invention is to provide a vehicle of achieving reduction of noise, reduction of cost and improvement of fuel consumption in a balanced manner.

According to the present invention, a vehicle includes a motor for driving wheels, an inverter to drive the motor, and a control device to perform pulse width modulation (PWM) control of the inverter. The control device performs synchronous PWM control in a case where an electric current supplied to the motor by the inverter or torque generated in the motor is larger than a threshold value; and performs the synchronous PWM control or non-synchronous PWM control in a case where the electric current or the torque is smaller than the threshold value and sets carrier frequency of the PWM control to be higher than the case where the electric current or the torque is larger than the threshold value.

In other aspect of this present invention, a vehicle includes a motor for driving wheels, an inverter to drive the motor, and a control device to perform pulse width modulation (PWM) control of the inverter. The control device determines carrier frequency of the PWM control so that heat generation of the inverter is minimized in a case where an electric current supplied to the motor by the inverter or torque generated in the motor is larger than a threshold value; and determines the carrier frequency so that a total of a loss in the inverter and a loss in the motor is minimized in a case where the electric current or the torque is smaller than the threshold value.

In further other aspect of this present invention, a vehicle includes a motor for driving wheels, an inverter to drive the motor, and a control device to perform pulse width modulation (PWM) control of the inverter. The control device determines carrier frequency of the PWM control so that heat generation of the inverter is minimized when an operating region of the motor defined by torque and rotation speed is a first region to protect the inverter from overheat; determines the carrier frequency of the PWM control so that noise of the motor is less detected by human when the operating region of the motor is a second region to reduce the noise of the motor; and determines the carrier frequency so that a total of a loss in the inverter and a loss in the motor is minimized when the operating region of the motor is a third region other than the first and second regions to reduce the noise of the motor.

Preferably, the control device performs synchronous PWM control in the first region; and performs the synchronous PWM control or non-synchronous PWM control in the second and third regions.

According to the present invention, it is possible to realize the vehicle of achieving the reduction of the noise, the reduction of the cost and the improvement of the fuel consumption in a balanced manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for illustrating a PWM wave pattern generated in a non-synchronous PWM control circuit 112 of FIG. 2.

FIG. 4 is a diagram for illustrating a PWM wave pattern generated in a synchronous PWM control circuit 110 of FIG. 2.

DESCRIPTION OF THE PREFERRED EMBODIMENTS

Figure 1:
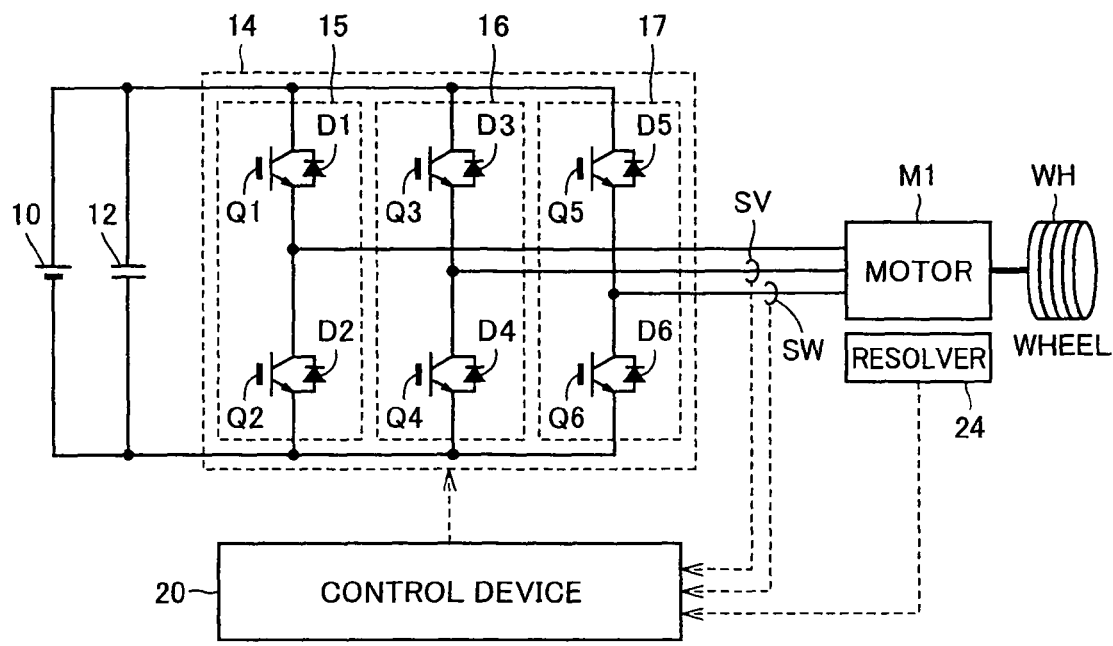
FIG. 1 is a circuit diagram showing a configuration of a motor drive device used in the present invention.

Hereinafter, embodiments of the present invention will be described in detail with reference to the drawings. The same or corresponding parts in the drawings are given the same reference signs and a description thereof will not be repeated.

First Embodiment

FIG. 1 is a circuit diagram showing a configuration of a motor drive device used in the present invention.

With reference to FIG. 1, this motor drive device includes a DC power supply 10, a capacitor 12, an inverter 14, current sensors SV and SW, a motor M1, a resolver 24, and a control device 20.

The DC power supply may be made of a secondary battery such as a nickel hydride battery, a lithium ion battery and a lead battery and the like. A large-capacity capacitor or a fuel cell may also be used together with or instead of the secondary battery.

Inverter 14 receives power supply voltage from DC power supply 10 and drives AC motor M1. Preferably, inverter 14 performs a regenerative operation at the time of braking motor M1 and returns electric power generated in AC motor M1 to DC power supply 10.

Inverter 14 includes a U phase arm 15, a V phase arm 16 and a W phase arm 17. U phase arm 15, V phase arm 16 and W phase arm 17 are connected in parallel between output lines of DC power supply 10. Capacitor 12 is also connected in parallel to these arms between the output lines of DC power supply 10.

U phase arm 15 includes IGBT devices Q1 and Q2 connected in series and diodes D1 and D2 connected in parallel to IGBT devices Q1 and Q2 respectively.

V phase arm 16 includes IGBT devices Q3 and Q4 connected in series and diodes D3 and D4 connected in parallel to IGBT devices Q3 and Q4 respectively.

W phase arm 17 includes IGBT devices Q5 and Q6 connected in series and diodes D5 and D6 connected in parallel to IGBT devices Q5 and Q6 respectively.

U phase arm 15, V phase arm 16 and W phase arm 17 are connected to motor M1 by three drive lines respectively. Diodes D1, D3 and D5 are connected taking a direction from the corresponding drive lines to a positive electrode of DC power supply 10 as a forward direction. Diodes D2, D4 and D6 are connected taking a direction from a negative electrode of DC power supply 10 to the corresponding drive lines as a forward direction.

This motor drive device further includes current sensor SV to detect an electric current of the drive line connecting the V phase arm to motor M1, and current sensor SW to detect an electric current of the drive line connecting the W phase arm to motor M1. Stator coils of motor M1 are connected in a Y shape, and a V phase coil, a W phase coil and a U phase coil are connected to a neutral point. Therefore, when the electric currents of the V phase and the W phase are given, control device 20 can calculate an electric current of the U phase.

Electric current values detected by current sensors SV and SW are transmitted to control device 20 together with a rotation speed of motor M1 detected by resolver 24. Control device 20 controls the rotation speed of motor M1 based on these detected values.

Figure 2:
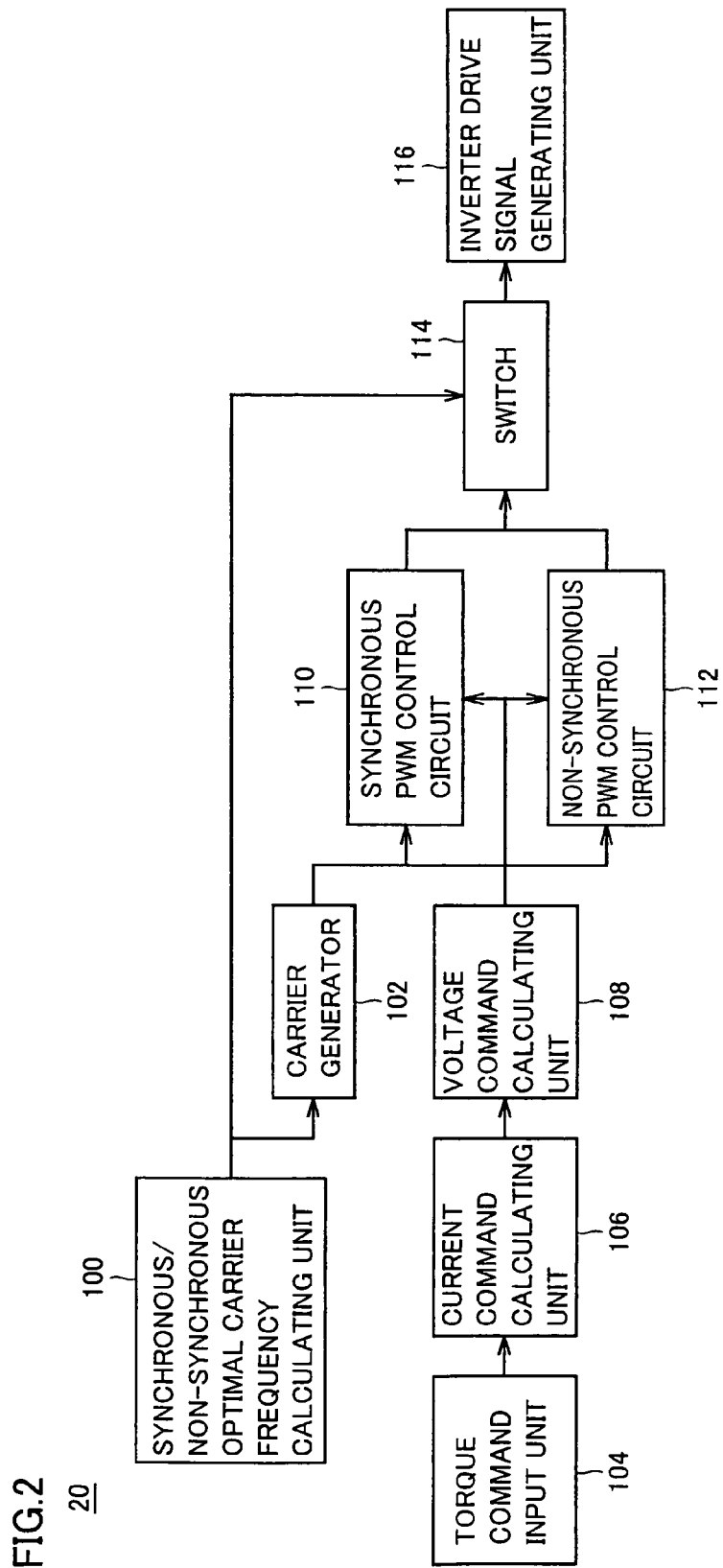
FIG. 2 is a block diagram showing a configuration of a control device 20.

FIG. 2 is a block diagram showing a configuration of control device 20.

With reference to FIG. 2, control device 20 includes a synchronous/non-synchronous optimal carrier frequency calculating unit 100, a carrier generator 102, a torque command input unit 104, a current command calculating unit 106, and a voltage command calculating unit 108.

Torque command input unit 104 outputs a torque command determined based on an acceleration demand from a driver given from an accelerator pedal position sensor, an acceleration/deceleration demand for maintaining vehicle speed designated by cruise control, the vehicle speed detected by a vehicle speed sensor or the like, and the like. Current command calculating unit 106 calculates a current command value of the inverter based on the torque command. Voltage command calculating unit 108 receives an output from the current command calculating unit 106 and outputs a voltage command value shown in FIG. 3 and FIG. 4 later.

Synchronous/non-synchronous optimal carrier frequency calculating unit 100 calculates optimal frequency of carrier frequency used for synchronous PWM control or non-synchronous PWM control based on the torque command, the vehicle speed or motor rotation speed. Synchronous/non-synchronous optimal carrier frequency calculating unit 100 also determines whether the synchronous PWM control or the non-synchronous PWM control is performed based on the torque command, the vehicle speed or the motor rotation speed. Carrier generator 102 generates a triangle wave of carrier frequency fc determined by synchronous/non-synchronous optimal carrier frequency calculating unit 100.

Control device 20 further includes a synchronous PWM control circuit 110, a non-synchronous PWM control circuit 112, a switch 114, and an inverter drive signal generating unit 116.

Synchronous PWM control circuit 110 compares the triangle wave generated by carrier generator 102 and a sinusoidal wave generated by voltage command calculating unit 108, and outputs a synchronous PWM wave pattern.

Non-synchronous PWM control circuit 112 compares the triangle wave generated by carrier generator 102 and the sinusoidal wave generated by voltage command calculating unit 108, and outputs a non-synchronous PWM wave pattern.

Switch 114 selects an output of one of synchronous PWM control circuit 110 and non-synchronous PWM control circuit 112 based on the selection by synchronous/non-synchronous optimal carrier frequency calculating unit 100. Inverter drive signal generating unit 116 generates a signal to drive the IGBT devices of inverter 14 based on the PWM wave pattern output by switch 114.

FIG. 3 is a diagram for illustrating the PWM wave pattern generated in non-synchronous PWM control circuit 112 of FIG. 2.

FIG. 4 is a diagram for illustrating the PWM wave pattern generated in synchronous PWM control circuit 110 of FIG. 2.

With reference to FIG. 3 and FIG. 4, in the synchronous PWM control, the voltage command and the carrier are generated so that a time when the voltage command serving as the sinusoidal wave is zero and a time when the carrier serving as the triangle wave is zero correspond to each other as shown by circle symbols. In FIG. 4, one cycle of the voltage command corresponds to nine cycles of the carrier. Therefore, there are many cases where a PWM output P1B generated from a time t0 to a time t2 and a PWM output P2B generated from a time t2 to a time t4 show the same wave pattern (nine pulses).

Meanwhile, in the non-synchronous PWM control, the time when the voltage command serving as the sinusoidal wave is zero and the time when the carrier serving as the triangle wave is zero do not always correspond to each other. Therefore, there are many cases where a PWM output P1A generated from a time to to a time t2 and a PWM output P2A generated from a time t2 to a time t4 often show different wave patterns from each other.

Figure 5:
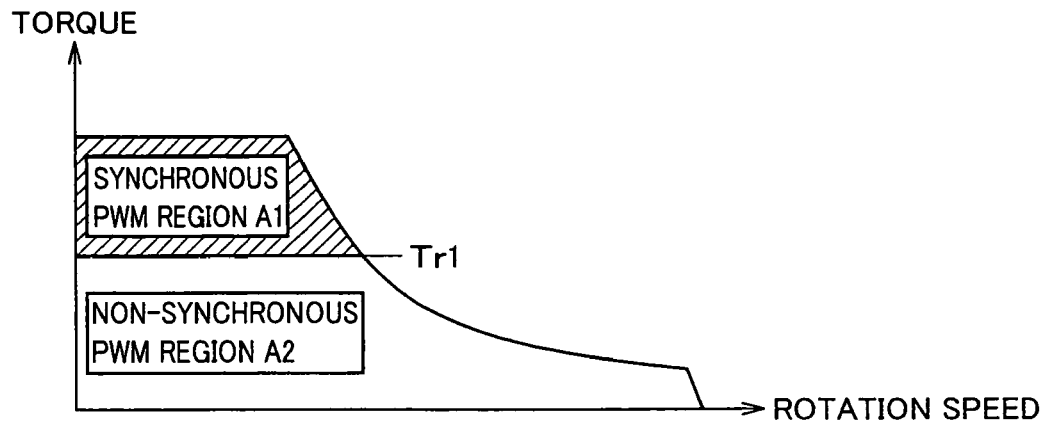
FIG. 5 is a diagram for illustrating switching control of a motor control method, applied in a first embodiment.

FIG. 5 is a diagram for illustrating switching control of a motor control method applied in a first embodiment.

With reference to FIG. 5, in the first embodiment, the switching is performed between synchronization and non-synchronization of carrier frequency fc relative to the voltage command in accordance with the motor electric current or the torque. The synchronous PWM control is adapted in a region where the torque is larger than a threshold value Tr1 as shown in a region A1, and the non-synchronous PWM control is adapted in a region where the torque is smaller than threshold value Tr1 as shown in a region A2. At the same rotation speed, higher carrier frequency or more pulse number is set on the smaller torque side than on the larger torque side.

Figure 6:
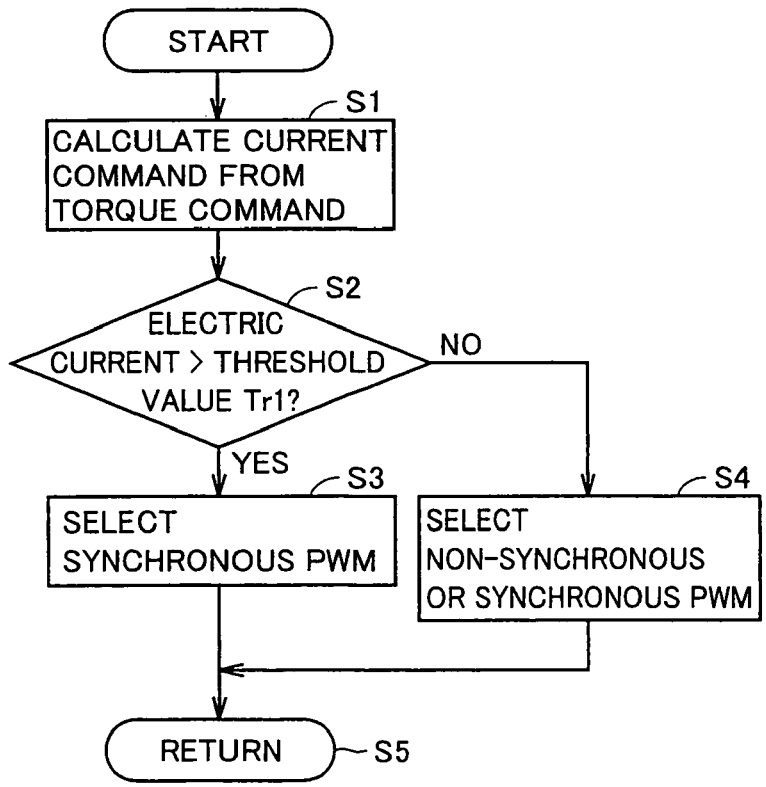
FIG. 6 is a flowchart for illustrating control executed in the first embodiment.

FIG. 6 is a flowchart for illustrating control executed in the first embodiment. Processing of this flowchart is invoked from a main routine of traveling control of the vehicle and executed at a prescribed time interval or for every time when a predetermined condition is satisfied.

With reference to FIG. 6, when the processing is started, the current command value is calculated from a torque command value in current command calculating unit 106 of FIG. 2 in Step S1. In Step S2, it is determined whether or not the current command value is larger than a value corresponding to threshold value Tr1 of FIG. 5. This threshold value is preliminarily determined with a map or the like from a view point of a controllability, heat generation of the inverter, noise sensed inside the vehicle or the like. It should be noted that a measurement value measured by the current sensor or an estimate value estimated by other methods may be used instead of the current command value used for the determination.

In Step S2, in a case where the current command value is larger than the value corresponding to threshold value Tr1, the processing proceeds to Step S3 and the synchronous PWM control is selected. In the synchronous PWM control, the voltage command value and an integer multiple of the carrier are synchronized with each other as shown in FIG. 4. The synchronous PWM control is characterized to be capable of driving with the small switching pulse number.

Meanwhile, in a case where the current command value is not larger than the value corresponding to threshold value Tr1 in Step S2, the processing proceeds to Step S4 and the non-synchronous or synchronous PWM control is selected. In a case where the non-synchronous PWM control is used, the control is characterized to be capable of driving with arbitrary carrier frequency.

In the synchronous PWM control, it is not possible to freely determine carrier frequency fc relative to the vehicle speed (in proportion to the motor rotation speed). However, the controllability of the electric current is more favorable in the synchronous PWM control than in the non-synchronous PWM control and hence it is possible to reduce the pulse number.

When the selection of the control method is finished in Step S3 or S4, the processing proceeds to Step S5 and the control is returned to the main routine.

Figure 7:
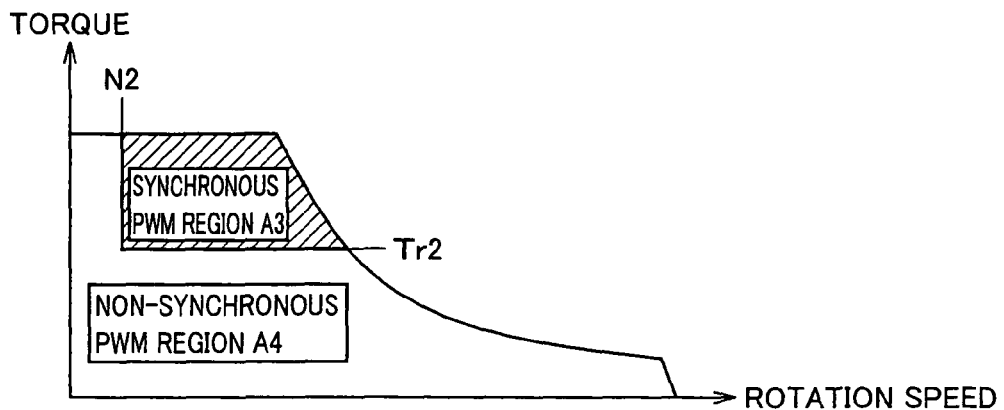
FIG. 7 is a diagram for illustrating switching control of carrier frequency, executed in a modified example of the first embodiment.

FIG. 7 is a diagram for illustrating switching control of the carrier frequency executed in a modified example of the first embodiment.

Figure 8:
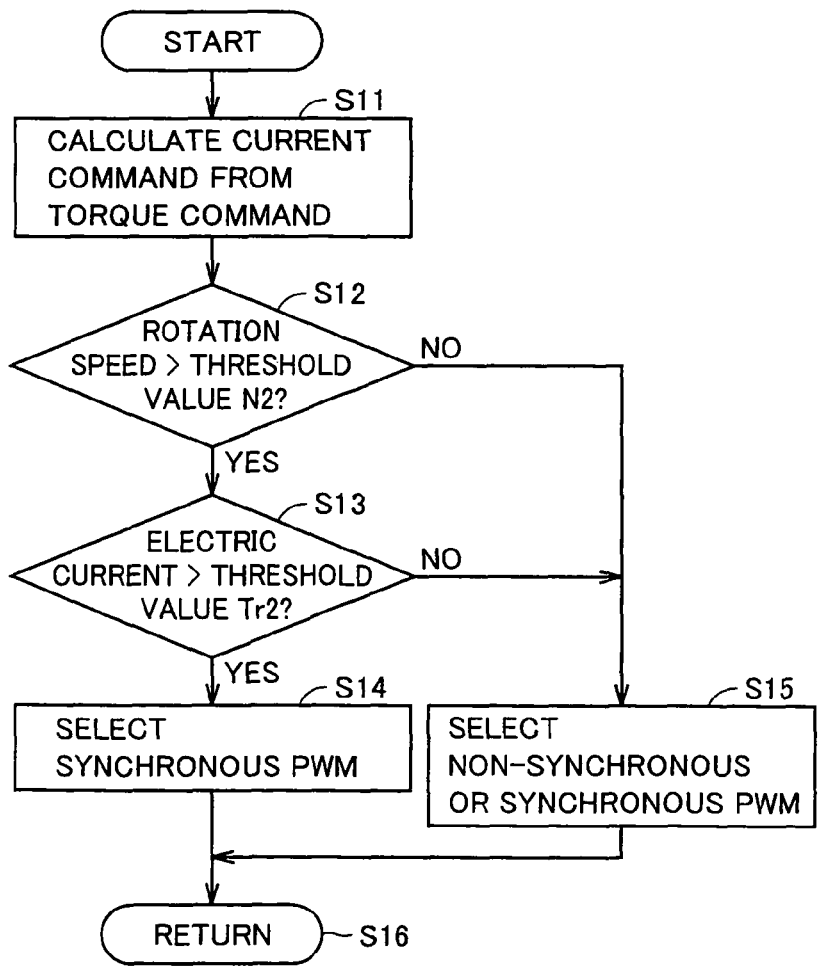
FIG. 8 is a flowchart for illustrating the control executed in the modified example of the first embodiment.

FIG. 8 is a flowchart for illustrating the control executed in the modified example of the first embodiment. Processing of this flowchart is invoked from the main routine of the traveling control of the vehicle and executed at a prescribed time interval or for every time when a predetermined condition is satisfied.

With reference to FIGS. 7 and FIG. 8, when the processing is started the current command value is calculated from the torque command value in current command calculating unit 106 of FIG. 2 in Step S11. In Step S12, it is determined whether or not the motor rotation speed is larger than a threshold value N2 of FIG. 7. The motor rotation speed detected by resolver 24 of FIG. 1 is available. At the time of a low rotation speed when the sufficient pulse number can be ensured relative to a change in the voltage command value, there is no need for synchronizing the voltage command value and the integer multiple of the carrier. Therefore, the motor rotation speed (or the vehicle speed) is added to a condition to determine whether the synchronous PWM control is performed as described above.

In Step S12, in a case where the rotation speed is larger than threshold value N2, the processing proceeds to Step S13, and in a case where the rotation speed is not larger than threshold value N2, the processing proceeds to Step S15.

In Step S13, it is determined whether or not the current command value is larger than a value corresponding to a threshold value Tr2 of FIG. 7. This threshold value is preliminarily determined with the map or the like from the view point of the controllability, the heat generation of the inverter, the noise sensed inside the vehicle or the like. It should be noted that the measurement value measured by the current sensor or the estimate value estimated by other methods may be used instead of the current command value used for the determination.

In Step 13, in a case where the current command value is larger than the value corresponding to threshold value Tr2, the processing proceeds to Step S14 and the synchronous PWM control is selected. In the synchronous PWM control, the voltage command value and the integer multiple of the carrier are synchronized with each other as shown in FIG. 4. The synchronous PWM control is characterized to be capable of driving with the small switching pulse number.

Meanwhile, in a case where the current command value is not larger than the value corresponding to threshold value Tr2 in Step S13, the processing proceeds to Step S15.

In Step S15, the non-synchronous or synchronous PWM control is selected. In a case where the non-synchronous PWM control is used, the control is characterized to be capable of driving with the arbitrary carrier frequency.

In the synchronous PWM control, it is not possible to freely determine carrier frequency fc relative to the vehicle speed (in proportion to the motor rotation speed). However, the controllability of the electric current is more favorable in the synchronous PWM control than in the non-synchronous PWM control and hence it is possible to reduce the pulse number.

When the selection of the control method is finished in Step S14 or S15, the processing proceeds to Step S16 and the control is returned to the main routine.

A large electric current flows through the motor in order to generate high torque. However, since the synchronous PWM control is adapted at this time in the vehicle of the first embodiment described above, it is possible to obtain a favorable controllability.

Due to an operating state that a sound relating to driving is originally large, there is often a case where a little increase in the noise is allowable. Therefore, carrier frequency fc is increased in proportion to the vehicle speed or the motor rotation speed. Then, there is a possibility of obtaining an acceleration feeling with a sound matched with a human intuition.

When the carrier frequency higher than an audible frequency range of human is selected at the time of low torque, it is possible to reduce the noise inside the vehicle. Particularly in a case of the non-synchronous PWM control, the carrier frequency can be highly freely selected. For example, it is possible to provide a flexible response of changing the carrier frequency so as to move electromagnetic vibration frequency from a resonance point of a construction material and the like.

As mentioned above, it is possible to achieve maintenance of the controllability and suppression of the noise at the same time in the vehicle of the first embodiment.

Second Embodiment

In the first embodiment, the control is performed by focusing on a point of switching between the synchronization of the carrier frequency with the voltage command value and the non-synchronization thereof. In a second embodiment, the control is performed by focusing on a loss of the inverter and a total loss of the motor and the inverter.

That is, in the second embodiment, the carrier frequency is determined so that the inverter loss is minimized in the region of a large electric current with high heat generation of the inverter, and the carrier frequency is determined so that the total loss of the motor and the inverter is minimized in other regions.

Figure 9:
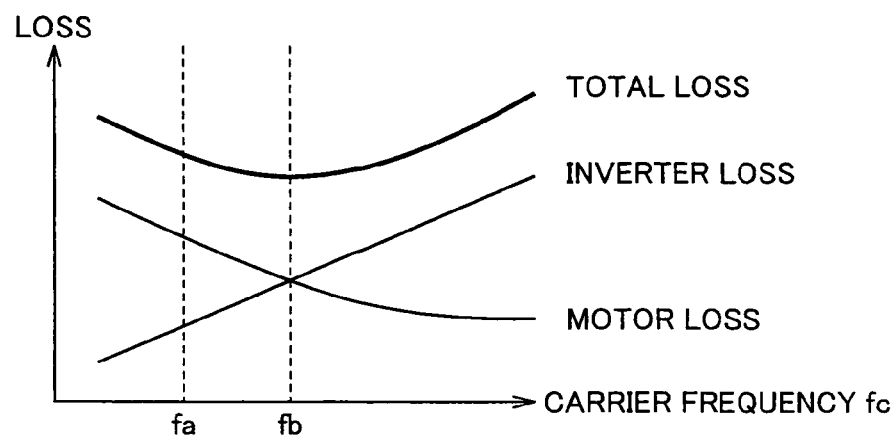
FIG. 9 is a diagram showing changes of an inverter loss and a total loss in a case where the carrier frequency is changed.

FIG. 9 is a diagram showing changes of the inverter loss and the total loss in a case where the carrier frequency is changed.

In FIG. 9, the carrier frequency is indicated by a lateral axis and the losses are indicated by a vertical axis. When the carrier frequency is increased, the inverter loss is increased in accordance with an increase in a switching loss. Meanwhile, when driving the motor with lower carrier frequency, the motor loss is increased due to an iron loss by an increase in a ripple current. Therefore, in order to improve driving efficiency for the vehicle, it is important to suppress the total loss of the inverter and the motor to be low.

A heat generating unit of the inverter is a small-sized switching device, that is, a semiconductor. Thermal capacity of the semiconductor is small, and overheat is caused for a short time (about a few seconds). Meanwhile, since thermal capacity of the motor is large, a little increase in the loss is allowable for a relatively long time (about a few minutes). Therefore, when the inverter loss is suppressed to be low, and for a short time, it is possible to drive the vehicle even an over current flows through the motor.

Frequency fa is carrier frequency to minimize the inverter loss. The lower the carrier frequency is, the lower the number of switching of the IGBT device is, so that the loss is reduced. This frequency is a lower limit value of the carrier frequency determined by the controllability of the PWM control of the motor or the like.

Frequency fb is carrier frequency to minimize total loss of the inverter loss and the motor loss.

Figure 10:
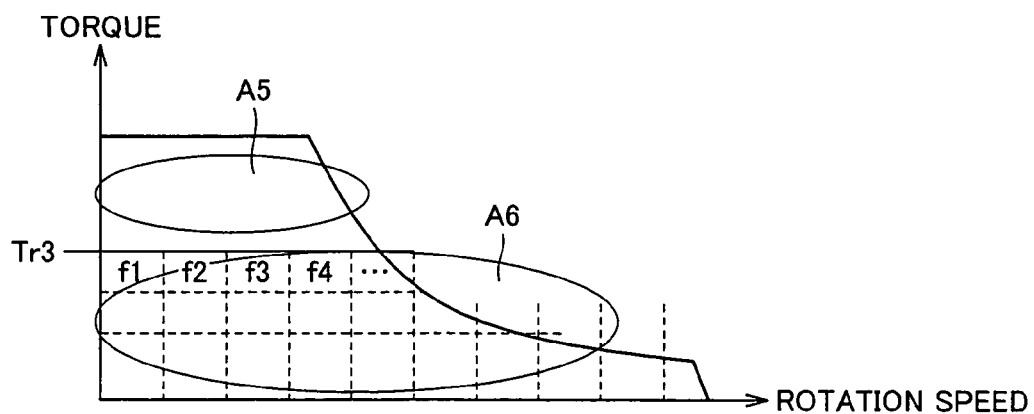
FIG. 10 is a diagram showing one example of a map used for determining the carrier frequency in a second embodiment.

FIG. 10 is a diagram showing one example of a map used for determining the carrier frequency in the second embodiment.

With reference to FIG. 10, a lateral axis indicates the motor rotation speed, and a vertical axis indicates the torque. The carrier frequency to minimize the inverter loss is given in a region A5 where the torque is larger than a threshold value Tr3. This carrier frequency is frequency fa in FIG. 9.

The carrier frequency to minimize the total of the inverter loss and the motor loss is given in a region A6 where the torque is smaller than threshold value Tr3. This carrier frequency is frequency fib in FIG. 9.

Carrier frequency f1, f2, f3, f4 . . . selected for each subdivided region surrounded by broken lines is preliminarily given in region A6. Carrier frequency f1, f2, f3, f4 . . . is carrier frequency fb to minimize the total loss determined based on a result of preliminarily measuring a characteristic shown in FIG. 9 for each region. Corresponding carrier frequency is read out from the map in accordance with the motor rotation speed and the torque (or the electric current).

Figure 11:
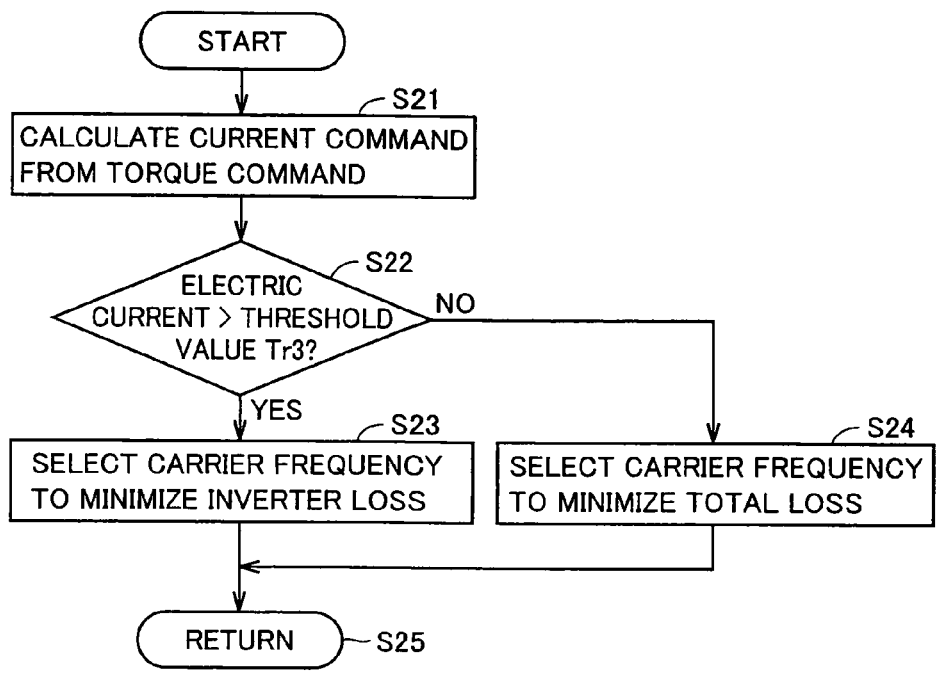
FIG. 11 is a flowchart for illustrating control executed in the second embodiment.

FIG. 11 is a flowchart for illustrating control executed in the second embodiment. Processing of this flowchart is invoked from the main routine of the traveling control of the vehicle and executed at a prescribed time interval or for every time when a predetermined condition is satisfied.

With reference to FIG. 10 and FIG. 11, when the processing is started at first, the current command value is calculated from the torque command value in current command calculating unit 106 of FIG. 2 in Step S21. In Step S22, it is determined whether or not the current command value is larger than a value corresponding to threshold value Tr3 of FIG. 10. This threshold value is preliminarily determined with the map or the like from the view point of the controllability, the heat generation of the inverter, the noise sensed inside the vehicle or the like. The measurement value measured by the current sensor or the estimate value estimated by other methods may be used instead of the current command value used for the determination.

In Step S22, in a case where the current command value is larger than the value corresponding to threshold value Tr3, the processing proceeds to Step S23, and the carrier frequency to minimize the inverter loss is selected. This frequency is frequency fa in FIG. 9.

Meanwhile, in a case where the current command value is not larger than the value corresponding to threshold value Tr3, the processing proceeds to Step S24, and the carrier frequency to minimize the total loss is selected. This frequency is frequency fb in FIG. 9.

When the selection of the carrier frequency in Step S23 or S24 is finished, the processing proceeds to Step S25, and the control is returned to the main routine. The PWM control is performed with using the selected carrier frequency in the main routine.

It should be noted that although FIG. 10 shows the example that the carrier frequency is determined by the torque (or the electric current) and the motor rotation speed, the map may be extended so as to determine the carrier frequency further by a temperature, voltage and the like.

As described above, in the vehicle of the second embodiment, the carrier frequency is determined so that the inverter loss is minimized in the region of a large electric current with high heat generation of the inverter, and the carrier frequency is determined so that the total loss of the motor and the inverter is minimized in other regions.

At the time of low torque, since there is some extra allowance room for the heat generation of the inverter, the carrier frequency to minimize the total loss of the inverter and the motor is actively selected in this region so as to improve fuel consumption.

At the time of high torque, since the overheat of the inverter can be prevented by using low carrier frequency, heat resistance of switching devices is not required too much so as to reduce cost of the inverter.

That is, it is possible to achieve cost reduction of the inverter and improvement of the fuel consumption at the same time.

Third Embodiment

A third embodiment is to combine the first and second embodiments.

Figure 12:
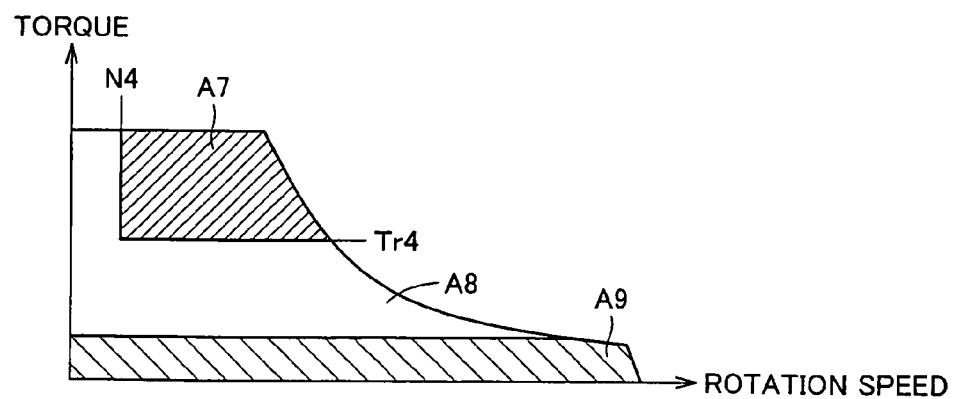
FIG. 12 is a diagram for illustrating carrier switching control executed in a third embodiment.

FIG. 12 is a diagram for illustrating carrier switching control executed in the third embodiment.

With reference to FIG. 12, a region A7 is a region where the IGBT device is driven with the minimum-required pulse number in the synchronous PWM control so as to protect the inverter from the overheat. A region A8 is a region where the IGBT device is driven with using the carrier frequency to minimize the total loss of the motor and the inverter so as to improve the fuel consumption with the best efficiency. A region A9 is a region where the torque is small, that is, acceleration and deceleration are not executed very often, and also a region where the carrier frequency to minimize the noise inside the vehicle is selected.

Figure 13:
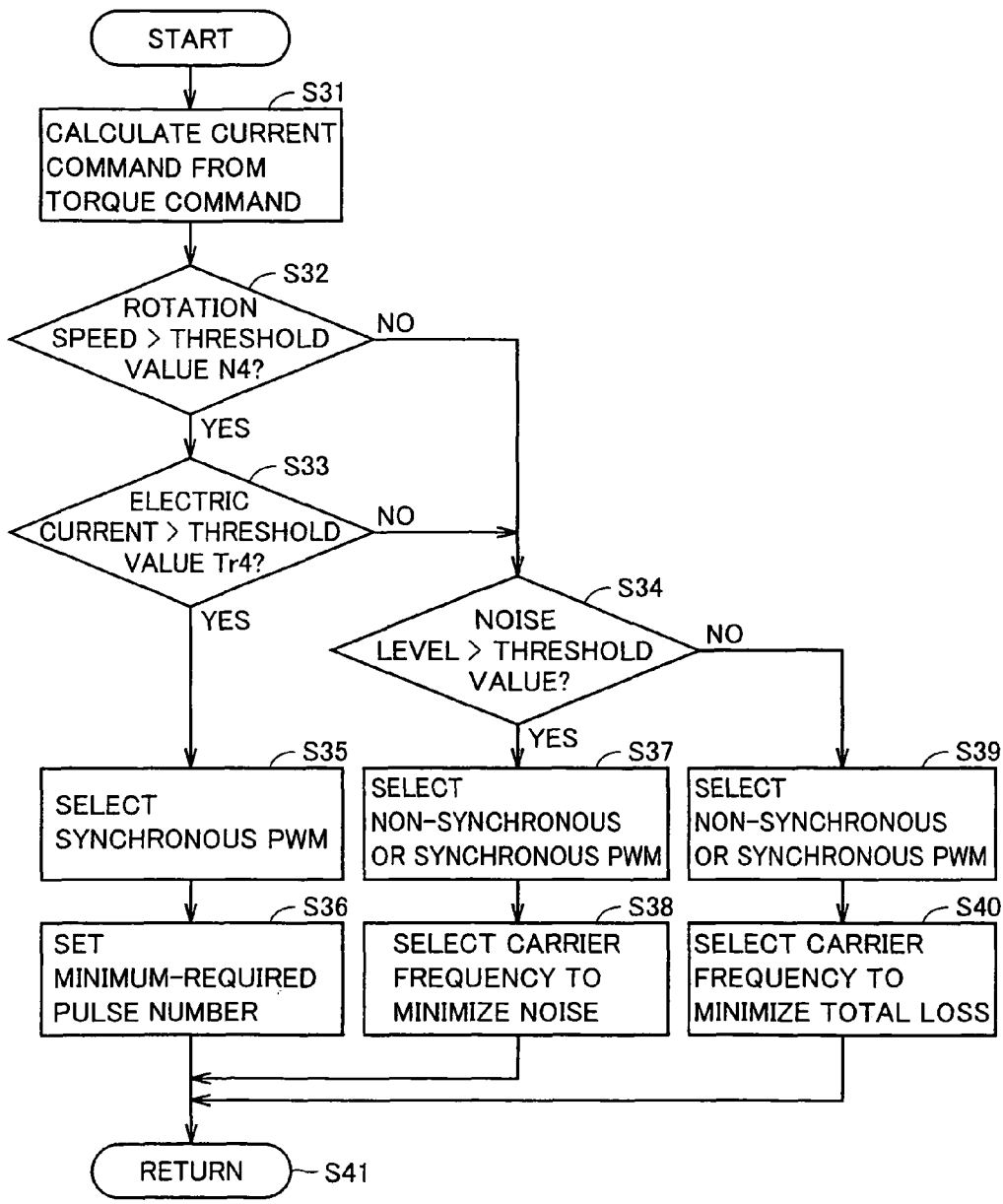
FIG. 13 is a flowchart for illustrating control executed in the third embodiment.

FIG. 13 is a flowchart for illustrating control executed in the third embodiment. Processing of this flowchart is invoked from the main routine of the traveling control of the vehicle and executed at a prescribed time interval or for every time when a predetermined condition is satisfied.

With reference to FIG. 12 and FIG. 13, when the processing is started the current command value is calculated from the torque command value in current command calculating unit 106 of FIG. 2 in Step S31. In Step S32, it is determined whether or not the motor rotation speed is larger than a threshold value N4 of FIG. 12. At the time of the low rotation speed when the sufficient pulse number can be ensured relative to the change in the voltage command value, there is no need for synchronizing the voltage command value and the integer multiple of the carrier. Therefore, the motor rotation speed (or the vehicle speed) is added to the condition to determine whether the synchronous PWM control is performed as described above.

In Step S32, in a case where the rotation speed is larger than threshold value N4, the processing proceeds to Step S33, and in a case where the rotation speed is not larger than threshold value N4, the processing proceeds to Step S34.

In Step S33, it is determined whether or not the current command value is larger than a value corresponding to a threshold value Tr4 of FIG. 12. This threshold value is preliminarily determined with the map or the like from the view point of the controllability, the heat generation of the inverter, the noise sensed inside the vehicle or the like. It should be noted that the measurement value measured by the current sensor or the estimate value estimated by other methods may be used instead of the current command value used for the determination.

In Step 33, in a case where the current command value is larger than the value corresponding to threshold value Tr4, the processing proceeds to Step S35 and the synchronous PWM control is selected. In the synchronous PWM control, the voltage command value and the integer multiple of the carrier are synchronized with each other as shown in FIG. 4. The synchronous PWM control is characterized to be capable of driving with the small switching pulse number. In Step S36, the carrier frequency is selected so that the PWM control is performed with the minimum-required pulse number in a current operating condition (the vehicle speed or required torque).

Meanwhile, in a case where the current command value is not larger than the value corresponding to threshold value Tr4 in Step S33, the processing proceeds to Step S34.

In Step S34, it is determined whether or not a noise level is larger than a threshold value. It should be noted that the noise level may be compared with a threshold value of a noise level by monitoring an actual noise, or the noise level may be determined by the motor rotation speed and the electric current (or the torque). In the latter case, the noise level may be determined based on whether or not the current operating condition (a combination of the motor rotation speed and the electric current (or the torque)) is within a region where the noise is larger than a threshold value of the noise as shown in region A9 of the map of FIG. 12.

In Step S34, in a case where the noise level is larger than the threshold value, the processing proceeds to Step S37, and the non-synchronous or synchronous PWM control is selected. In Step S38, the carrier frequency to minimize the noise under the current operating condition is selected.

Meanwhile, in a case where the noise level is not larger than the threshold value in Step S34, the processing proceeds to Step S39, and the non-synchronous or synchronous PWM control is selected. In Step S40, the carrier frequency to minimize the total loss under the current operating condition is selected.

When the selection of the control method is finished in Step S36, S38 or S40, the processing proceeds to Step S41 and the control is returned to the main routine.

As described above, in the third embodiment, the synchronous PWM control is adapted on the side of a large electric current (the side of large torque) of a motor operating region, and the PWM control is performed with the minimum-required pulse number (such as six pulses). On the side of a small electric current, the carrier frequency is set to be higher than the audible range of human in a region where the noise is problematic, and the PWM control is performed with the carrier frequency to minimize the total loss of the motor and the inverter in a region where the noise is not problematic.

Thereby, in the large torque region, the controllability is improved by the synchronous PWM control and it is possible to further make the carrier frequency low. Then, the inverter switching loss can be suppressed and the heat resistance of the switching device is not required too much. Therefore, it is also possible to reduce the cost of the inverter.

In the low torque region, the carrier frequency is set so as to reduce the noise. In a case where noise of the wind and noise of traveling on a road are large and a low noise level of the inverter is not required too much, it is also possible to set low carrier frequency with a low total loss.

Therefore, it is possible to establish a drive system with low cost and excellent fuel consumption while maintaining a traveling performance such as the good controllability and the low noise.

Finally, the present invention will be summarized with reference to FIG. 1 and the like. The vehicle of the present embodiment includes motor M1 for driving wheels WH; inverter 14 to drive motor M1; and control device 20 to perform the PWM control of inverter 14. Control device 20 performs the synchronous PWM control in a case where the electric current supplied to motor M1 by inverter 14 or the torque generated in the motor is larger than the threshold value; and performs the synchronous PWM control or the non-synchronous PWM control in a case where the electric current or the torque is smaller than the threshold value and sets the carrier frequency or the pulse number of the PWM control to be higher than the case where the electric current or the torque is larger than the threshold value.

The vehicle of other embodiment includes motor M1 for driving wheels WH; inverter 14 to drive motor M1; and control device 20 to perform the PWM control of inverter 14. As shown in FIG. 12, control device 20 determines the carrier frequency of the PWM control so that the heat generation of the inverter is minimized in a case where the electric current supplied to motor M1 by inverter 14 or the torque generated in the motor is larger than the threshold value; and determines the carrier frequency so that the total of the loss in the inverter and the loss in the motor is minimized in a case where the electric current or the torque is smaller than the threshold value.

The vehicle of further other embodiment includes motor M1 for driving wheels WH; inverter 14 to drive motor M1; and control device 20 to perform the PWM control of inverter 14. Control device 20 determines the carrier frequency of the PWM control so that the heat generation of the inverter is minimized when the operating region of the motor defined by the torque and the rotation speed is within first region A7 to protect the inverter from the overheat; determines the carrier frequency of the PWM control so that the noise of motor M1 is less detected by human when the operating region of the motor is within second region A9 to reduce the noise of the motor; and determines the carrier frequency so that the total of the loss in the inverter and the loss in the motor is minimized when the operating region of the motor is within third region A8 other than the first and second regions to reduce the noise of the motor.

Preferably, control device 20 performs the synchronous PWM control in the first region; and performs the synchronous PWM control or the non-synchronous PWM control in the second and third regions.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle, comprising:
a motor for driving wheels;
an inverter to drive said motor; and
a control device to perform pulse width modulation (PWM) control of said inverter, wherein
said control device performs a first control and sets carrier frequency of the PWM control to a first frequency in a case where an electric current supplied to said motor by said inverter or torque generated in said motor is larger than a threshold value; and performs a second control and sets said carrier frequency higher than said first frequency in a case where said electric current or said torque is smaller than said threshold value, and
said first control performs synchronous PWM control without permission of performing non-synchronous PWM control, and said second control selectively performs the synchronous PWM control or the non-synchronous PWM control with permission of performing said non-synchronous PWM control.

2. A vehicle, comprising:
a motor for driving wheels;
an inverter to drive said motor; and
a control device to perform pulse width modulation (PWM) control of said inverter, wherein
said control device performs a first control and determines carrier frequency of the PWM control so that heat generation of said inverter is minimized in a case where an electric current supplied to said motor by said inverter or torque generated in said motor is larger than a threshold value; and performs a second control and determines the carrier frequency so that a total of a loss in said inverter and a loss in said motor is minimized in a case where said electric current or said torque is smaller than said threshold value, and
said first control performs synchronous PWM control without permission of performing non-synchronous PWM control, and said second control selectively performs the synchronous PWM control or the non-synchronous PWM control with permission of performing said non-synchronous PWM control.

3. A vehicle, comprising:

a motor for driving wheels;

an inverter to drive said motor; and a control device to perform pulse width modulation (PWM) control of said inverter, wherein said control device determines carrier frequency of the PWM control so that heat generation of said inverter is minimized in a first region where a rotation speed of said motor is higher than a prescribed speed and a torque of said motor is higher than a prescribed torque; determines the carrier frequency of the PWM control so that noise in said vehicle is minimized in a second region where said torque is lower than said prescribed torque by at least a prescribed value; and determines the carrier frequency so that a total of a loss in said inverter and a loss in said motor is minimized in a third region other than the first and second regions.

4. The vehicle according to claim 3, wherein said control device performs a first control in said first region; and performs a second control in said second and third regions, and said first control performs synchronous PWM control without permission of performing non-synchronous PWM control, and said second control selectively performs the synchronous PWM control or the non-synchronous PWM control with permission of performing said non-synchronous PWM control.

* * * * *